(12) United States Patent
Segawa et al.

(10) Patent No.: US 11,281,415 B2
(45) Date of Patent: Mar. 22, 2022

(54) PRINTING METHOD

(71) Applicant: SCREEN HOLDINGS CO., LTD., Kyoto (JP)

(72) Inventors: Hiroyuki Segawa, Kyoto (JP); Yohei Onuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/178,922

(22) Filed: Feb. 18, 2021

(65) Prior Publication Data

US 2021/0271440 A1   Sep. 2, 2021

(30) Foreign Application Priority Data

Feb. 28, 2020   (JP) .............................. JP2020-033223

(51) Int. Cl.
  *G06F 3/12*   (2006.01)
  *B41J 2/02*   (2006.01)

(52) U.S. Cl.
  CPC .............. *G06F 3/1285* (2013.01); *B41J 2/02* (2013.01); *G06F 3/1275* (2013.01); *B41J 2002/022* (2013.01)

(58) Field of Classification Search
  CPC .... G06F 3/1285; G06F 3/1275; G06F 3/1215; G06F 3/1247; G06F 3/1282; G06F 3/1262; B41J 2/02; B41J 2002/022

USPC ......................................................... 358/1.15
  See application file for complete search history.

(56) References Cited

U.S. PATENT DOCUMENTS

| | | | |
|---|---|---|---|
| 7,283,258 B1* | 10/2007 | Kuno | .................... B41J 2/17566 |
| | | | 358/1.13 |
| 10,382,637 B2* | 8/2019 | Matsushita | ......... G03G 15/5016 |
| 2005/0264832 A1 | 12/2005 | Baum et al. | |
| 2008/0270402 A1* | 10/2008 | Inoue | ..................... G06F 3/1212 |
| 2012/0044529 A1 | 2/2012 | Sugimoto | |
| 2014/0132988 A1 | 5/2014 | Keane et al. | |

FOREIGN PATENT DOCUMENTS

| | | |
|---|---|---|
| EP | 2 645 693 A2 | 10/2013 |
| JP | 2002-182875 A | 6/2002 |
| JP | 2012-043123 A | 3/2012 |
| WO | 2008/039689 A2 | 4/2008 |

\* cited by examiner

*Primary Examiner* — Neil R McLean
(74) *Attorney, Agent, or Firm* — McDermott Will & Emery LLP

(57) ABSTRACT

After specifying a processing target (target data), a requirement for printing is set. A simulation of a RIP process is performed on the target data under a plurality of printing conditions which are set in advance. Then, based on simulation results, a print-target identifying record is registered in a continuous printing list so as to satisfy the set requirement. After rearranging print-target identifying records registered in the continuous printing list, continuous printing is performed based on the continuous printing list.

13 Claims, 23 Drawing Sheets

Fig.4

| DATA |
|---|
| ABC.pdf |
| XY987.pdf |
| BOOK.pdf |
| ⋮ |

Fig.5

| DATA | PRINTING CONDITION |
|---|---|
| ABC.pdf | XA(P1) |
| XY987.pdf | XA(P1) |
| STAR.pdf | XA(P2) |
| BOOK.pdf | XA(P1) |
| EFG.pdf | XA(P2) |
| ⋮ | ⋮ |

Fig.7

| DATA | JOB INFORMATION | | | | INK INFORMATION | | | | RIP INFORMATION | | PDF ANALYSIS INFORMATION | | |
|---|---|---|---|---|---|---|---|---|---|---|---|---|---|
| | NUMBER OF PAGES | NUMBER OF COPIES | PRINTING CONDITION | PRINTING SPEED | B | C | M | Y | RESULTS | RIP SPEED | FORMS | IMAGES | PROBLEMS |
| DOG.pdf | 50 | 200 | XA(P1) | 75 | 23 | 16 | 15 | 18 | NORMAL | 120 | 15 | 154 | 13, 32 |
| | | | XA(P2) | 120 | 20 | 12 | 11 | 14 | NORMAL | 464 | | | |
| | | | XB(P1) | 65 | 50 | 29 | 25 | 29 | NORMAL | 50 | | | |
| | | | XB(P2) | 120 | 54 | 36 | 34 | 42 | NORMAL | 460 | | | |
| | | | YZ(P1) | 120 | 31 | 22 | 22 | 26 | NORMAL | 468 | | | |
| | | | YZ(P2) | 150 | 40 | 29 | 26 | 34 | NORMAL | 521 | | | |
| SEA.pdf | 100 | 350 | XA(P1) | 75 | 29 | 26 | 22 | 30 | NORMAL | 131 | 20 | 808 | 2, 17 |
| | | | XA(P2) | 120 | 32 | 33 | 18 | 32 | NORMAL | 405 | | | |
| | | | XB(P1) | 65 | 21 | 36 | 33 | 39 | NORMAL | 100 | | | |
| | | | XB(P2) | 120 | 40 | 31 | 23 | 36 | NORMAL | 462 | | | |
| | | | YZ(P1) | 120 | 45 | 49 | 45 | 37 | NORMAL | 473 | | | |
| | | | YZ(P2) | 150 | 22 | 24 | 20 | 28 | NORMAL | 514 | | | |
| TREE.pdf | 10 | 1000 | XA(P1) | 75 | | | | | ERROR | | 14 | 160 | 12 |
| | | | XA(P2) | 120 | | | | | ERROR | | | | |
| | | | XB(P1) | 65 | | | | | ERROR | | | | |
| | | | XB(P2) | 120 | | | | | ERROR | | | | |
| | | | YZ(P1) | 120 | 42 | 51 | 36 | 31 | NORMAL | 417 | | | |
| | | | YZ(P2) | 150 | 27 | 36 | 21 | 34 | NORMAL | 523 | | | |

Fig.8

| INK COLOR | COEFFICIENT |
|---|---|
| B | 55 |
| C | 51 |
| M | 54 |
| Y | 58 |

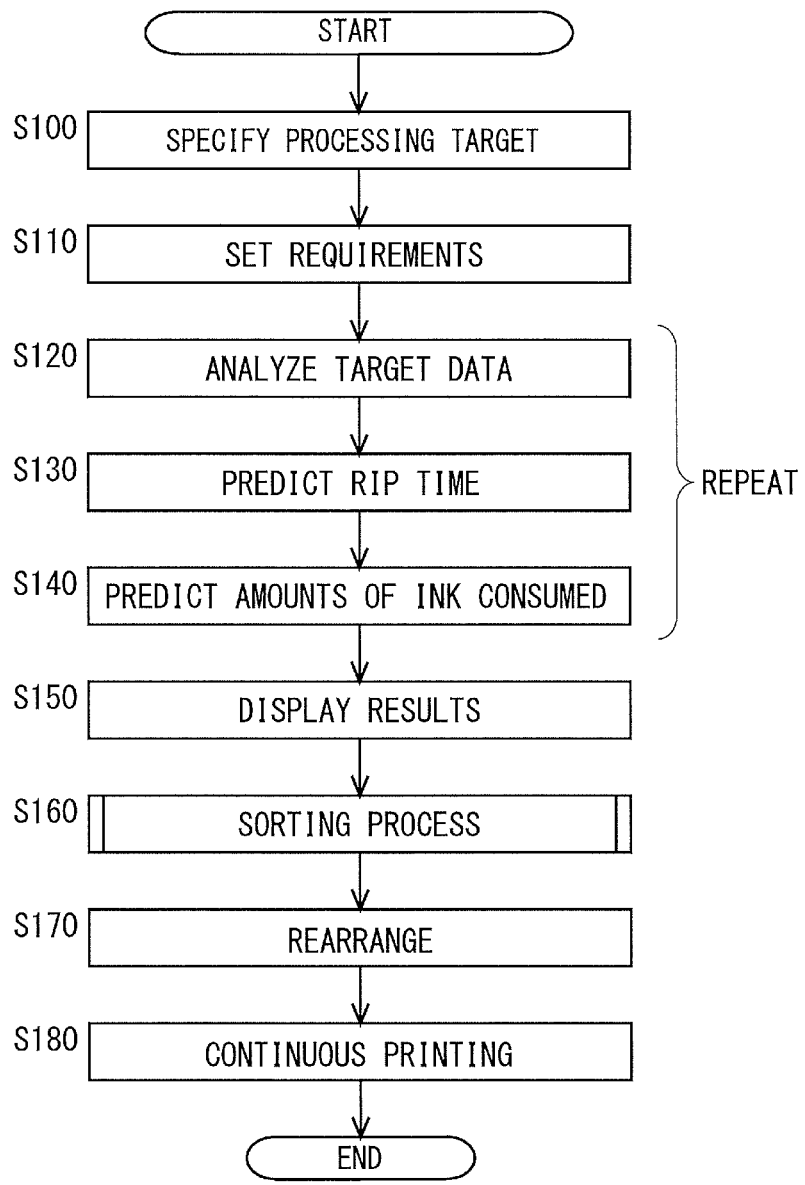

| 621 | 622 | 623 | 624 |
|---|---|---|---|
| ALL | PREDICTIONS OF RIP SPEEDS | PREDICTIONS OF AMOUNTS OF INK CONSUMED | PRINTER INFORMATION |

625

| BASIC INFORMATION | |
|---|---|
| JOB NAME | BOOK-1 |
| JOB ID | P0015397 |
| PRINTER'S MODEL NAME | JET003 |
| REPORT CREATION DATE AND TIME | 2020/1/16 11:22:33 |
| ⋮ | ⋮ |

626

| PREDICTIONS OF RIP SPEEDS | |
|---|---|
| TOTAL NUMBER OF SHEETS | 110 |
| PRINTING SPEED [mpm] | 120 |
| PREDICTED SPEED (FRONT SIDE) [mpm] | 607.1 |
| PREDICTED SPEED (BACK SIDE) [mpm] | 620.3 |
| RESULTS | NO PROBLEM |
| ⋮ | ⋮ |
| SIMULATION GRAPHS | FRONT SIDE ～65<br>BACK SIDE ～66 |

627

| PREDICTIONS OF AMOUNTS OF INK CONSUMED | | | |
|---|---|---|---|
| NUMBER OF COPIES PRINTED | 1 | | |
| NUMBER OF SHEETS | 110 | | |
| INKS | Total | Front | Back |
| Black | 0.574 | 0.295 | 0.279 |
| Cyan | 0.026 | 0.013 | 0.013 |
| ⋮ | ⋮ | ⋮ | ⋮ |

628

| PRINTER INFORMATION | |
|---|---|
| PRINTER'S MODEL NAME | JET003 |
| PRINTING CONDITION | XYZ_600×450dpi |
| ⋮ | ⋮ |

Fig.13

| DATA | RIP SPEED |
|---|---|
| STAR.pdf | 200 |
| BUS.pdf | 150 |
| CAKE.pdf | 220 |
| DOG.pdf | 120 |

| DATA | RIP SPEED |
|---|---|
| DOG.pdf | 120 |
| BUS.pdf | 150 |
| STAR.pdf | 200 |
| CAKE.pdf | 220 |

| PRINTING CONDITION |
|---|
| XA(P1) |
| XA(P2) |
| XB(P2) |
| YZ(P1) |
| YZ(P2) |

Fig.17

| PRINTING CONDITION | PRICE |
|---|---|
| XA(P1) | 3935 |
| XA(P2) | 3118 |
| XB(P2) | 9078 |
| YZ(P1) | 5523 |
| YZ(P2) | 7055 |

Fig.18

| PRINTING CONDITION | PRICE |
|---|---|
| XA(P1) | 3935 |
| XA(P2) | 3118 |
| YZ(P1) | 5523 |

| PRINTING CONDITION | PRICE | DELIVERABLE DATE |
|---|---|---|
| XA(P1) | 3935 | 2019/12/25 |
| XA(P2) | 3118 | 2019/12/27 |
| YZ(P1) | 5523 | 2019/12/24 |

Fig.20

| PRINTING CONDITION | PRICE | DELIVERABLE DATE |
|---|---|---|
| XA(P1) | 3935 | 2019/12/25 |
| YZ(P1) | 5523 | 2019/12/24 |

| DATA |
|---|
| BOOK.pdf |
| TIGER.pdf |
| TEA.pdf |

Fig.22

| DATA |
|---|
| BOOK.pdf |
| TIGER.pdf |
| TEA.pdf |
| DOG.pdf |

| NUMBER | OUTPUT SAMPLE | PRICE | AVAILABLE DATE | |
|---|---|---|---|---|
| OUTPUT DESTINATION SELECTION ||||||
| 1 | | 4000 yen | December 25 | OK |
| 2 | | 6000 yen | December 24 | OK |
| ⋮ | ⋮ | ⋮ | ⋮ | ⋮ |

| PREDICTIONS OF RIP SPEEDS | |
|---|---|
| TOTAL NUMBER OF SHEETS | 1500 |
| PRINTING SPEED[mpm] | 150 |
| PREDICTED SPEED(FRONT SIDE) [mpm] | 951 |
| PREDICTED SPEED(BACK SIDE) [mpm] | 954 |
| RESULTS | NO PROBLEM |

| PREDICTIONS OF AMOUNTS OF INK CONSUMED | | | |
|---|---|---|---|
| NUMBER OF COPIES PRINTED | 1 | | |
| NUMBER OF SHEETS | 1500 | | |
| INKS | Total | Front | Back |
| Black | 61.240 | 23.918 | 37.321 |
| Cyan | 54.744 | 22.831 | 31.913 |
| ⋮ | ⋮ | ⋮ | ⋮ |

Fig.30
PRIOR ART

| PAGES | ANALYSIS NUMBER | PROBLEMS |
|---|---|---|
| 3 | 13 | Different size pages are used in data. |
| Total 25 | 32 | 30 or more patterns are used. |
| Total 12 | 8 | An image with a data size of 10 mb or more is used. |
| .... | .... | .... |

PRINTING METHOD

BACKGROUND OF THE INVENTION

Field of the Invention

The present invention relates to a printing method for a printing system that performs continuous printing using a plurality of printing conditions.

Description of Related Art

In a printing system where a workflow process is performed, first, an editing process using elements constituting printed matter is performed by a computer (e.g., a personal computer) called a front end, using DTP software, etc. By the editing process, page data (e.g., a PostScript file or a PDF file) in which a print target is described in a page description language, etc., is generated. Then, a RIP process (rasterizing process) on the page data is performed. By this, the page data is converted into print data which is image data in bitmap format representing images of the print target. Then, the print data is sent to a digital printing machine (e.g., an inkjet printing apparatus), and the digital printing machine performs printing based on the print data. Alternatively, a plate-making apparatus makes printing plates using the print data, and a plate printing machine performs printing using the printing plates.

In such a printing system, conventionally, time required for a RIP process (hereinafter, simply referred to as "RIP time".) is predicted for the purpose of, for example, efficiently using resources such as a printing machine. In addition, in recent years, software that performs a simulation of a RIP process (hereinafter, referred to as "RIP simulation software".) has been introduced to the market. In the RIP simulation software, a RIP process is performed on page data in an environment (hereinafter, referred to as "simulation environment".) different from an actual environment where a printout is actually performed. There is a correlation between RIP speed under the actual environment and RIP speed under the simulation environment, and predicted RIP time under the actual environment is determined from RIP time under the simulation environment based on the correlation. In addition, typical RIP simulation software is provided with a function of predicting the amounts of ink consumed, based on image data obtained as a result of a RIP process under the simulation environment, and a function of analyzing internal data constituting page data in order to present a user with the possibility of occurrence of a problem with a RIP process under the actual environment.

When a simulation is performed using the conventional RIP simulation software, there are created, for example, a report called an "output prediction report" that shows results of a RIP process, and a report called a "PDF analysis report" that shows results of analysis of a PDF file which is page data. The output prediction report and the PDF analysis report are created in PDF.

FIG. 27 is a diagram showing an example of a RIP speed prediction page 900 which is a part of an output prediction report. As shown in FIG. 27, on the RIP speed prediction page 900 there are displayed the predicted values of RIP speeds (predicted RIP speeds), etc., in a case in which a RIP process is performed in an actual environment. FIG. 28 is a diagram showing an example of an amount-of-ink-consumed prediction page 905 which is a part of the output prediction report. As shown in FIG. 28, on the amount-of-ink-consumed prediction page 905 there are displayed the predicted values of the amounts of ink consumed for each ink color (for each type of ink).

FIG. 29 is a diagram showing an example of a RIP time prediction graph 910 included in the output prediction report. A horizontal axis is sheet number and a vertical axis is RIP time. In the example shown in FIG. 29, predicted RIP times for every 750 sheets are represented by a line graph given reference sign 911. In addition, RIP time corresponding to printing speed at which a printout is actually performed is represented by a dotted line given reference sign 912. It can be grasped that if all points on the line graph 911 are present in a region below the dotted line 912, then a RIP process is certainly performed in time for the output operation of a printing machine. On the other hand, it can be grasped that if a point on the line graph 911 is present in a region above the dotted line 912, then there is a possibility that a RIP process may not be performed in time for the output operation of the printing machine. Note that when there is a high possibility that a RIP process may not be performed in time for the output operation of the printing machine, it is considered to perform a RIP process before an actual printout (pre-RIP) or reduce printing speed.

FIG. 30 is a diagram showing an example of a page (hereinafter, referred to as "analysis result page".) 920 which is a part of a PDF analysis report and shows results of analysis of internal data constituting a PDF file. The analysis result page 920 shows results for items having problems among a plurality of analysis items. For example, a row given reference sign 921 shows that page 3 has a problem concerning an item identified by "analysis number=13". In addition, for example, a row given reference sign 922 shows that 25 pages in total have a problem concerning an item identified by "analysis number=32". Meanwhile, it cannot be grasped, from the row given reference sign 922, specifically which page has the problem. Hence, the PDF analysis report includes a page (hereinafter, referred to as "detailed information page".) showing a correspondence relation between an analysis number and pages having a problem. FIG. 31 is a diagram showing an example of a detailed information page 930. For example, a row given reference sign 931 shows numbers of the 25 pages having a problem concerning the item identified by "analysis number=32". By a PDF analysis report such as that described above, a user can grasp what problem can occur on which page when a RIP process is performed under an actual environment.

Meanwhile, in printing operations, continuous printing of a plurality of page data is often performed. In the continuous printing, a RIP process and a print process using print data obtained as a result of the RIP process are continuously performed on the plurality of page data. Conventionally, an instruction to perform such continuous printing is provided by, for example, registering, by a user, page data which are continuous printing targets from a controller screen of a printing machine. Regarding this, when the continuous printing targets include page data having a problem, a continuous printing process may stop in the middle. Hence, by referring to the above-described output prediction report and PDF analysis report, page data having a problem is excluded from continuous printing targets.

Note that in relation to the present invention, the following prior art documents are known. Japanese Laid-Open Patent Publication No. 2002-182875 discloses an invention of a printing control apparatus that can perform efficient scheduling. The printing control apparatus predicts RIP time and print processing time for each of a plurality of jobs, and creates an optimal schedule for the plurality of jobs based on results of the prediction so as to, for example, minimize waiting time. In addition, Japanese Laid-Open Patent Publication No. 2012-43123 discloses an invention of a processing order determination apparatus that determines processing order for processing a plurality of jobs before deadlines. The processing order determination apparatus calculates, for each of a plurality of jobs, a remaining period based on a period before a deadline and a predicted processing period, and determines order of processing-target jobs such that processing-target jobs with shorter remaining periods are processed earlier.

For example, a printing company in which massive printouts are performed uses a plurality of printing machines. RIP simulation software is installed on a server connected to a printing machine. In a printing system including a plurality of printing machines, there is a need to install RIP simulation software on servers whose number is equal to the number of the printing machines. That is, for each printing machine, RIP simulation software is installed on a corresponding server. Thus, in a case of performing continuous printing of a large volume of page data by a plurality of printing machines in a distributed manner, there is a need to take into account results of a simulation of a RIP process for each server.

Meanwhile, regardless of whether a printing system includes a plurality of printing machines, generally, each printing machine performs printouts while changing a plurality of conditions. For example, paper size, resolution, printing speed, etc., are changed according to a print target. Note that when a printing system includes a plurality of printing machines, the plurality of printing machines need to be distinguished from each other. Hence, in this specification, a combination of conditions regarding whether or not printing is permitted, printing quality, printing productivity, or the like, e.g., a printing machine, paper size, resolution, and printing speed, is referred to as "printing condition".

A customer that requests a printing company for printing has various needs regarding printing. Thus, in a case in which continuous printing is performed using a plurality of printing conditions, upon determining processing order, the customer's needs need to be taken into account. In addition, as described above, in a case of performing continuous printing of a large volume of page data by a plurality of printing machines in a distributed manner, simulation results for each server need to be taken into account. Regarding this, since a simulation result is obtained for each printing condition, even if only one printing machine is used, if a plurality of printing conditions are used, then there is a need to take into account, for each page data, a plurality of simulation results corresponding to the respective plurality of printing conditions. As a result, in order to determine processing order for continuous printing so as to satisfy customers' needs, a large amount of information needs to be taken into account. Therefore, the conventional printing system has difficulty in determining suitable processing order for continuous printing.

SUMMARY OF THE INVENTION

Hence, an object of the present invention is to implement continuous printing in suitable order that satisfies needs of each customer (a person or a company that requests a printing company for printing), with no load on a user (an operator at the printing company), in a printing system that performs continuous printing using a plurality of printing conditions.

One aspect of the present invention is directed to a printing method for a printing system that performs, for each printing condition, continuous printing of a plurality of page data, the printing method including:

a page data specifying step of specifying page data that is a continuous printing target;

a requirement setting step of setting a requirement for printing for each target data that is the page data specified in the page data specifying step;

a RIP simulation step of performing a simulation of a RIP process on the target data under a plurality of printing conditions which are set in advance;

a target data sorting step of registering a record in a continuous printing list corresponding to one of the plurality of printing conditions so as to satisfy the requirement set in the requirement setting step, based on simulation result data for each of the plurality of printing conditions obtained in the RIP simulation step, the record identifying the target data; and a continuous printing performing step of performing a continuous printing process on a group of page data identified by records registered in a created continuous printing list, under a printing condition corresponding to the created continuous printing list, the continuous printing process including a RIP process and a print process using print data obtained as a result of the RIP process.

According to such a configuration, prior to performing a continuous printing process, a requirement (customer's needs) for printing page data (target data) specified as a continuous printing target can be set. A simulation of a RIP process is performed on the target data under a plurality of printing conditions which are set in advance. Then, a printing condition is determined based on simulation results so as to satisfy the set requirement, and a record that identifies the target data is registered in a continuous printing list corresponding to the printing condition. That is, in a case in which continuous printing is performed using a plurality of printing conditions, it becomes possible to perform, for each page data, a printing process under an optimal printing condition, taking into account simulation results, the operating conditions of printing machines, etc. Accordingly, in a printing system that performs continuous printing using a plurality of printing conditions, continuous printing in suitable order that satisfies each customer's needs can be implemented, with no load on a user.

These and other objects, features, modes, and advantageous effects of the present invention will become more apparent from the following detailed description of the present invention with reference to the accompanying drawings.

BRIEF DESCRIPTION OF THE DRAWINGS

FIG. 4 is a diagram showing an example of a continuous printing list in the first embodiment;

FIG. 5 is a diagram showing another example of a continuous printing list in the first embodiment;

FIG. 7 is a diagram schematically showing contents held in a result database in the first embodiment;

FIG. 8 is a diagram showing an example of a table that holds information on a coefficient for price calculation for each ink color in the first embodiment;

FIG. 9 is a flowchart for describing the entire processing procedure from specification of a PDF file which is a continuous printing target to performing of continuous printing in the first embodiment;

FIG. 10 is a diagram showing an example of an output prediction report in the first embodiment;

FIG. 13 is a diagram for describing rearrangement of print-target identifying records in the first embodiment;

FIG. 14 is a diagram for describing the rearrangement of print-target identifying records in the first embodiment;

FIG. 16 is a diagram for describing filtering based on RIP speeds in the first embodiment;

FIG. 17 is a diagram for describing computation of a price in the first embodiment;

FIG. 18 is a diagram for describing filtering based on prices in the first embodiment;

FIG. 19 is a diagram for describing filtering based on deadlines in the first embodiment;

FIG. 20 is a diagram for describing the filtering based on deadlines in the first embodiment;

FIG. 21 is a diagram for describing registration (addition) of a print-target identifying record in a continuous printing list in the first embodiment;

FIG. 22 is a diagram for describing the registration (addition) of a print-target identifying record in a continuous printing list in the first embodiment;

FIG. 26 is a diagram showing an example of an output destination selection screen in the second embodiment;

FIG. 27 is a diagram showing an example of a RIP speed prediction page in a conventional example;

FIG. 28 is a diagram showing an example of an amount-of-ink-consumed prediction page in the conventional example;

FIG. 30 is a diagram showing an example of an analysis result page in the conventional example.

DETAILED DESCRIPTION OF PREFERRED EMBODIMENTS

Embodiments of the present invention will be described below with reference to the accompanying drawings.

1. First Embodiment 1.1 Overall Configuration of a Printing System

Figure 1:
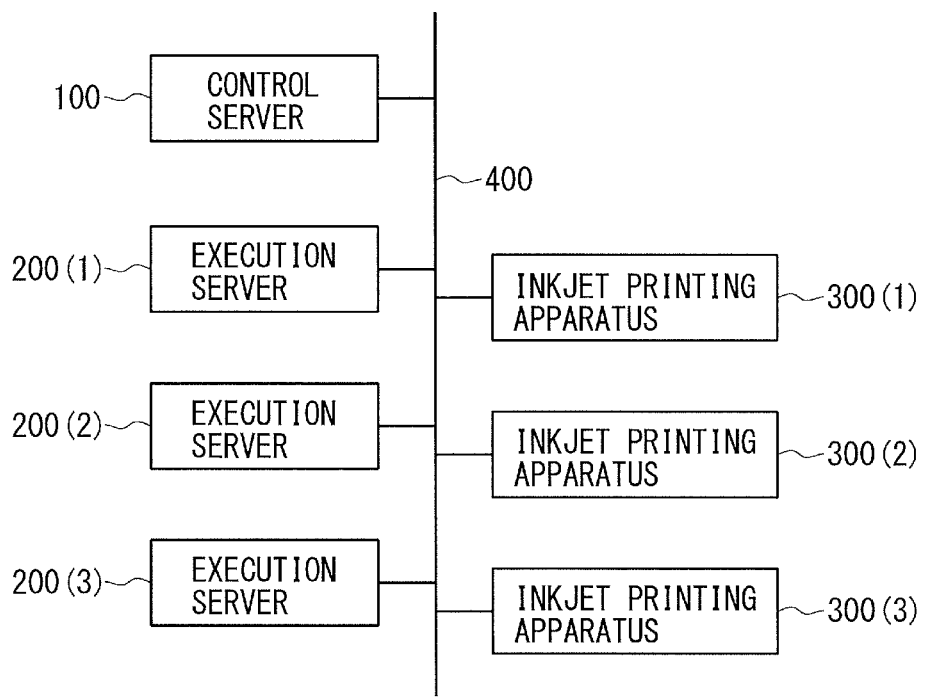
FIG. 1 is an overall configuration diagram of a printing system according to a first embodiment of the present invention.

FIG. 1 is an overall configuration diagram of a printing system according to a first embodiment of the present invention. The printing system includes a control server 100, three execution servers 200(1) to 200(3), and three inkjet printing apparatuses 300(1) to 300(3). The control server 100, the execution servers 200(1) to 200(3), and the inkjet printing apparatuses 300(1) to 300(3) are communicably connected to each other by a communication line 400. Note that the numbers of the execution servers 200 and the inkjet printing apparatuses 300 are not particularly limited, and there may be a single execution server 200 and a single inkjet printing apparatus 300.

The control server 100 controls the entire printing process in the printing system. The control server 100 has RIP simulation software (RIP simulation program) installed thereon. That is, the control server 100 functions as a simulation server, and a RIP process is performed in the control server 100 in a simulation stage before a printout is actually performed. The execution servers 200(1) to 200(3) and the inkjet printing apparatuses 300(1) to 300(3) have a one-to-one correspondence. When the inkjet printing apparatuses 300(1) to 300(3) each actually perform a printout, the execution servers 200(1) to 200(3) each perform a RIP process on print-target page data. That is, the execution servers 200(1) to 200(3) function as RIP servers. The inkjet printing apparatuses 300(1) to 300(3) each perform a printout based on print data (image data in bitmap format obtained as a result of the RIP process) which is digital data, without using printing plates.

Each inkjet printing apparatus 300 includes a printing machine main body and a controller that controls the printing machine main body. Note that, regarding the printing machine main body of each inkjet printing apparatus 300, a printing machine main body for printing on the front side of a sheet and a printing machine main body for printing on the back side of a sheet may be provided. In this case, each of the control server 100 and the execution server 200 may be separated into a server for the front side and a server for the back side, too. In addition, a client's personal computer connected to the communication line 400 may be allowed to control the control server 100 to perform a simulation of a RIP process.

Meanwhile, in the present embodiment, the RIP simulation software is provided with a function of creating a continuous printing list for performing continuous printing for each printing condition by each inkjet printing apparatus 300, in addition to a function of performing a simulation of a RIP process. Note, however, that the function of performing a simulation of a RIP process and the function of creating a continuous printing list may be implemented by different softwares (programs).

1.2 Hardware Configuration of the Control Server

Figure 2:
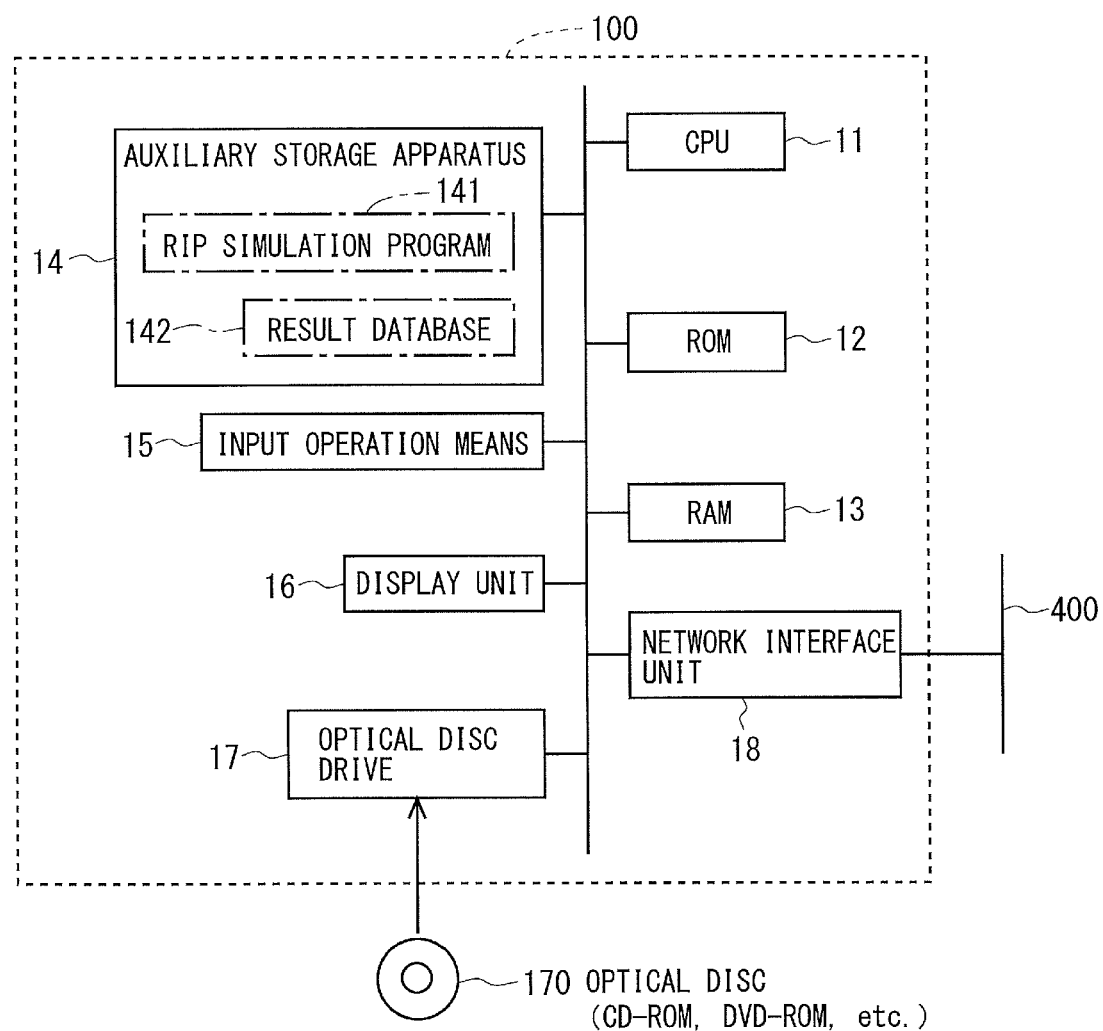
FIG. 2 is a hardware configuration diagram of a control server of the first embodiment.

FIG. 2 is a hardware configuration diagram of the control server 100 of the present embodiment. The control server 100 is implemented by a personal computer, and includes a CPU 11, a ROM 12, a RAM 13, an auxiliary storage apparatus 14, an input operation means 15, a display unit 16, an optical disc drive 17, and a network interface unit 18. The auxiliary storage apparatus 14 stores a RIP simulation program 141 for performing a simulation of a RIP process and creating continuous printing lists. In addition, the auxiliary storage apparatus 14 is provided with a result database 142 that stores result data of simulations of RIP processes. Furthermore, the auxiliary storage apparatus 14 also stores continuous printing lists and submission data which is sent via the communication line 400.

As described above, the RIP simulation program 141 is stored in the auxiliary storage apparatus 14. When the control server 100 is instructed to start RIP simulation software, the RIP simulation program 141 is read into the RAM 13, and the CPU 11 executes the RIP simulation program 141 read into the RAM 13. In this manner, the control server 100 functions as a simulation server. That is, the control server 100 performs a simulation of a RIP process. The RIP simulation program 141 is provided stored in a computer-readable recording medium (non-transient recording medium) such as a CD-ROM or a DVD-ROM. That is, a user, for example, purchases an optical disc (a CD-ROM, a DVD-ROM, etc.) 170 which is a recording medium for the RIP simulation program 141, and places the optical disc 170 into the optical disc drive 17, by which the RIP simulation program 141 is read from the optical disc 170 and installed on the auxiliary storage apparatus 14. Alternatively, instead of this, the RIP simulation program 141 which is sent through the communication line 400 may be received by the network interface unit 18 and installed on the auxiliary storage apparatus 14.

1.3 Functional Configuration

Figure 3:
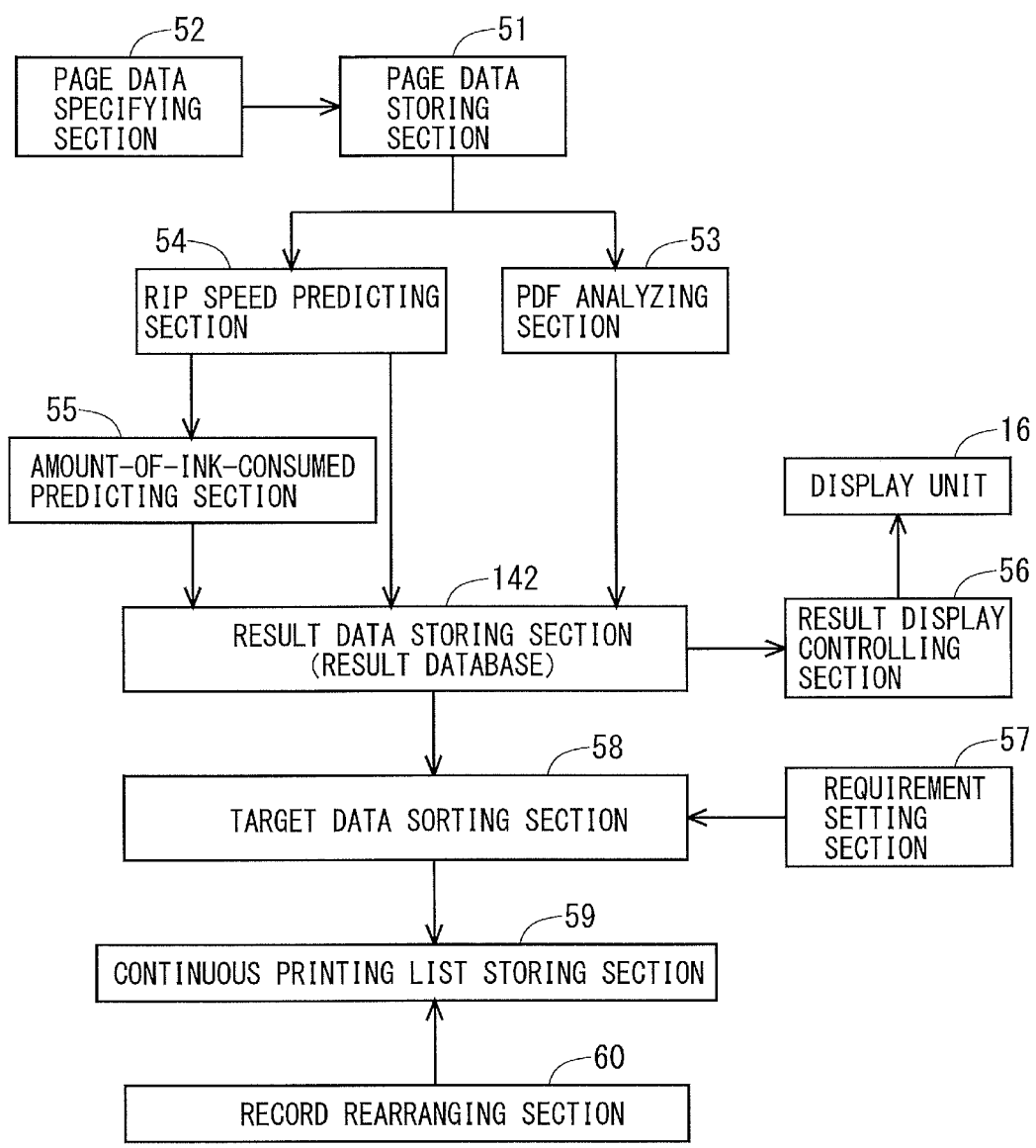
FIG. 3 is a block diagram showing a functional configuration implemented on the control server by RIP simulation software in the first embodiment.

FIG. 3 is a block diagram showing a functional configuration implemented on the control server 100 by the RIP simulation software. The control server 100 functionally includes a page data storing section 51, a page data specifying section 52, a PDF analyzing section 53, a RIP speed predicting section 54, an amount-of-ink-consumed predicting section 55, a result display controlling section 56, a requirement setting section 57, a target data sorting section 58, a continuous printing list storing section 59, a record rearranging section 60, the result data storing section (result database) 142, and the display unit 16. Note that the page data storing section 51 and the continuous printing list storing section 59 are implemented by the auxiliary storage apparatus 14 which is hardware.

The page data storing section 51 holds submission data which is page data including a plurality of pages. In the present embodiment, it is assumed that the submission data is a PDF file. Thus, the page data storing section 51 holds PDF files. Note that the page data storing section 51 may be provided in a different apparatus than the control server 100.

The page data specifying section 52 specifies a processing-target PDF file from among the PDF files held in the page data storing section 51. Specifically, the user specifies a PDF file which is a continuous printing target, using the page data specifying section 52.

The PDF analyzing section 53 analyzes internal data constituting the PDF file specified by the page data specifying section 52. Note that the PDF file specified by the page data specifying section 52 is hereinafter referred to as "target data". The analysis of the internal data by the PDF analyzing section 53 is performed for a plurality of items (analysis items) related to a RIP process. Examples of the analysis items include, for example, the following items:

Example 1: whether or not an image with a predetermined resolution or higher is used Example 2: whether or not there is invalid data size of an image Example 3: whether or not there is a font that is not embedded The RIP speed predicting section 54 performs a RIP process on the target data in a different environment than an actual environment where a printout is actually performed, and thereby predicts a RIP speed and RIP time for each sheet in a case in which a RIP process is performed on the target data in the actual environment. In the present embodiment, specifically, the RIP speed predicting section 54 performs a RIP process on the target data on the control server 100, and thereby predicts a RIP speed and RIP time for each sheet in a case in which a RIP process is performed on the target data on an execution server 200. Note that a correspondence relation between a sheet and pages upon actually performing a printout is preset (i.e., imposition settings are performed in advance), and the RIP process by the RIP speed predicting section 54 is performed taking into account the correspondence relation.

The amount-of-ink-consumed predicting section 55 predicts, for each ink color (each type of ink), the amount of ink consumed, taking into account a printing condition and using image data obtained as a result of the RIP process performed by the RIP speed predicting section 54.

The result data storing section (result database) 142 holds results of the analysis of the internal data performed by the PDF analyzing section 53 and simulation results for the RIP process (results of the RIP process performed by the RIP speed predicting section 54 and results of the prediction of the amounts of ink consumed which is made by the amount-of-ink-consumed predicting section 55).

The result display controlling section 56 controls screen display of the results of the analysis of the internal data performed by the PDF analyzing section 53 or the simulation results for the RIP process on the display unit 16, based on user's operations using the input operation means 15.

The requirement setting section 57 sets requirements for printing regarding the target data. Specifically, a screen for inputting, by the user, system conditions and customer's conditions for each target data is prepared as the requirement setting section 57, and requirements are set by user's input operations. Examples of the customer's conditions include a requirement for a budget, a requirement for a deadline, and a requirement for quality. Note that it is preferred that when a plurality of customer's conditions are inputted, the requirement setting section 57 be able to set their priorities.

The target data sorting section 58 registers a record that identifies the target data in a continuous printing list corresponding to one of a plurality of printing conditions so as to satisfy the requirements set by the requirement setting section 57, based on the results held in the result data storing section (result database) 142. The registration will be further described with reference to FIGS. 1 and 4 to 6.

As shown in FIG. 1, in the present embodiment, the printing system includes the three inkjet printing apparatuses 300(1) to 300(3). Here, it is assumed that the three inkjet printing apparatuses 300(1), 300(2), and 300(3) are assigned apparatus names "XA", "XB", and "YZ", respectively. In addition, here, for convenience of description, it is assumed that in each inkjet printing apparatus 300, only paper size is changed as a change of a condition upon printout. Regarding this, it is assumed that in each inkjet printing apparatus 300, paper size identified by the name "P1" and paper size identified by the name "P2" are prepared. From the above, the printing system of the present embodiment can perform a printing process using six printing conditions. Here, for example, a printing condition that 'printing is performed by the inkjet printing apparatus 300 assigned the apparatus name "XA", using the paper size identified by the name "P1" is represented as "XA(P1)".

As described above, in the present embodiment, a printing process can be performed using six printing conditions. Continuous printing is performed for each printing condition. In order to enable continuous printing for each printing condition, a continuous printing list including a list of records that identify PDF files which are continuous printing targets (hereinafter, referred to as "print-target identifying records") is prepared for each printing condition. In the present embodiment, six continuous printing lists are prepared. FIG. 4 is a diagram showing an example of a continuous printing list. As can be grasped from FIG. 4, in the present embodiment, a filename of a PDF file which is a continuous printing target is registered as a print-target identifying record in the continuous printing list.

Note that a continuous printing list may be prepared for each apparatus instead of each printing condition. In this case, the continuous printing list also holds information on a printing condition corresponding to each PDF file. That is, the continuous printing list in this case is, for example, the one shown in FIG. 5.

Figure 6:
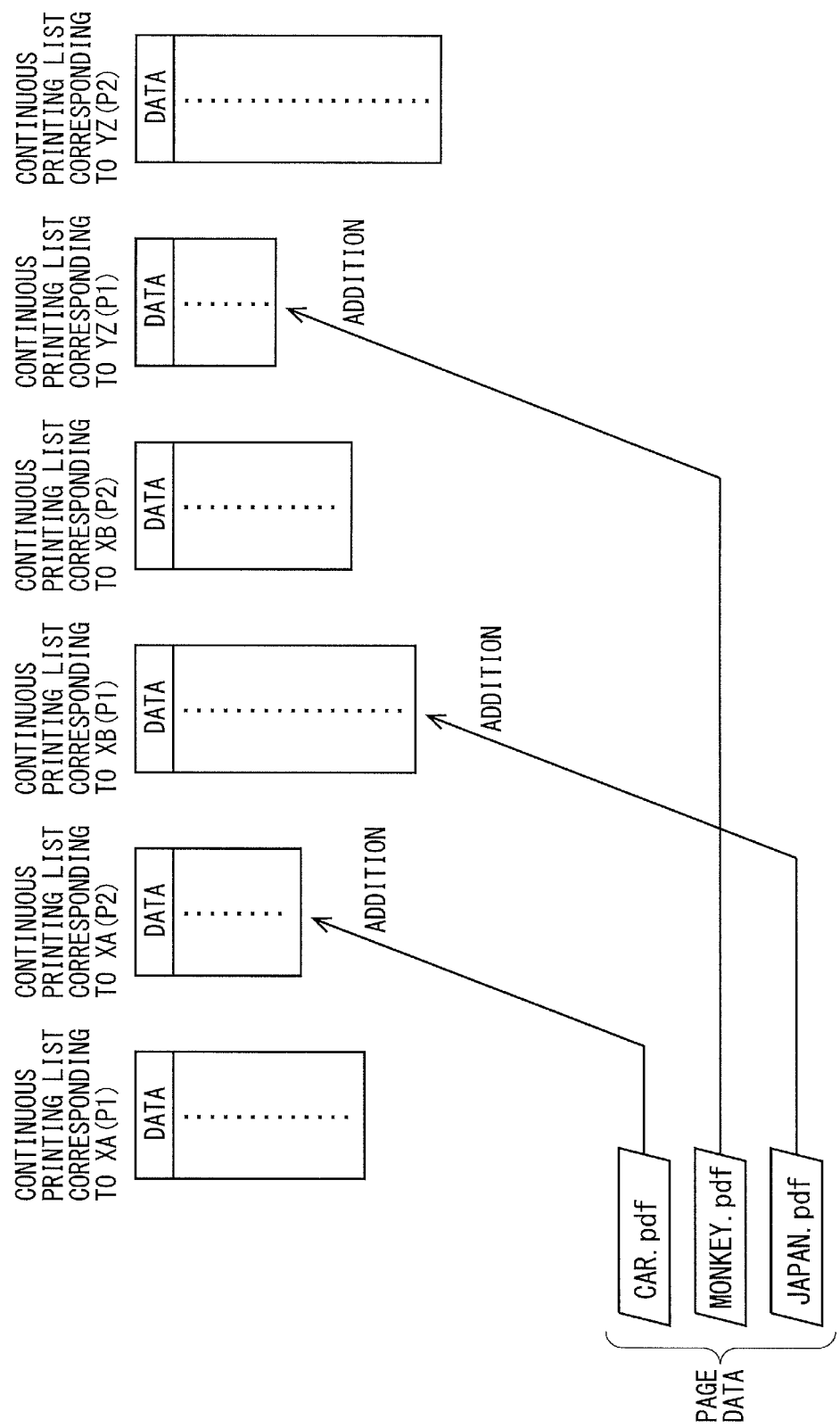
FIG. 6 is a diagram for describing a sorting process in the first embodiment.

For example, in a case in which there are three PDF files to be added as continuous printing targets, as schematically shown in FIG. 6, a filename of each PDF file is added (registered) as a print-target identifying record to a continuous printing list corresponding to a printing condition that is most matched to requirements for printing the PDF file, based on the results held in the result data storing section (result database) 142. A process performed by the target data sorting section 58 is hereinafter referred to as "sorting process".

The continuous printing list storing section 59 holds continuous printing lists. The record rearranging section 60 rearranges print-target identifying records registered in a continuous printing list, according to a predetermined rule. As will be described later, in the present embodiment, as a system requirement, a requirement that a continuous printing process be performed in increasing order of RIP speed is set. Thus, in the present embodiment, the record rearranging section 60 rearranges a plurality of print-target identifying records based on the RIP speed corresponding to each print-target identifying record, so that a continuous printing process for a group of PDF files registered in a continuous printing list is performed in increasing order of the RIP speed. Note that a plurality of print-target identifying records may be rearranged so that a continuous printing process for a group of PDF files is performed in such a manner that a PDF file whose RIP speed is close to an average RIP speed is first processed and a PDF file whose RIP speed is far from the average RIP speed is later processed.

1.4 Data Required for a Sorting Process

Figure 8:
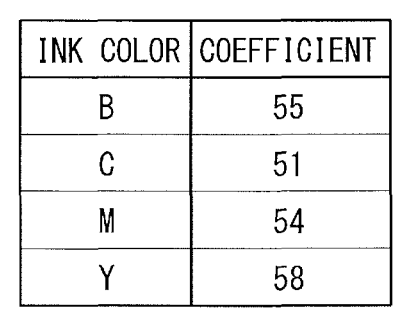

Now, data required for a sorting process performed by the target data sorting section 58 will be described. The sorting process needs to be performed taking into account simulation results for a RIP process. Thus, simulation results held in the result database 142 are required. FIG. 7 is a diagram schematically showing contents held in the result database 142. As can be grasped from FIG. 7, for each PDF file, simulation results such as the amounts of ink consumed and a RIP speed are held for each printing condition. In addition, in the present embodiment, a deadline can be set as a customer's condition. Thus, there is a need to grasp a deliverable date for each printing condition. Meanwhile, a schedule for each printing condition in each inkjet printing apparatus 300 is managed by a process management system. Hence, in the present embodiment, information on a schedule for each printing condition can be obtained from the process management system and held. Furthermore, in the present embodiment, as a customer's condition, a budget (upper limit fora price) can be set. Thus, there is a need to determine a price for each printing condition. A price can be determined based on the amount of ink consumed for each ink color, and thus, in the present embodiment, a table as shown in FIG. 8 that holds information on a coefficient for price calculation for each ink color is prepared in advance.

1.5 Processing Procedure

A processing procedure in the present embodiment will be described below.

<1.5.1 Entire Processing Procedure>

First, the entire processing procedure from specification of a PDF file which is a continuous printing target to performing of continuous printing will be described with reference to a flowchart shown in FIG. 9. Note that regarding FIG. 9, processes at step S100 to S160 are performed on a single PDF file, and processes at step S170 and S180 are performed for each continuous printing list after performing the processes at step S100 to S160 on multiple PDF files.

First, the user specifies a PDF file (page data) which is a continuous printing target by the page data specifying section 52 (step S100). Then, the user sets requirements for printing by the requirement setting section 57 (step S110). In the present embodiment, at this step S110, a budget and a deadline are set as customer's conditions. In addition, here, it is assumed that at this step S110 a requirement that a continuous printing process be performed in increasing order of the RIP speed is set as a system requirement.

Then, the PDF analyzing section 53 analyzes internal data constituting target data (the PDF file specified at step S100) (step S120). Then, the RIP speed predicting section 54 performs a RIP process on the target data on the control server 100, and predicts a RIP speed and RIP time for each sheet, based on results of the RIP process (step S130). Then, the amount-of-ink-consumed predicting section 55 predicts the amount of ink consumed for each ink color (step S140). Results obtained at the processes at step S120 to S140 are stored in the result database 142. Note that the processes at step S120 to S140 are performed for each printing condition. That is, the processes at step S120 to S140 are repeated the number of printing conditions prepared in the printing system. As described above, the printing system according to the present embodiment can perform a printing process using six printing conditions. Thus, in the present embodiment, the processes at step S120 to S140 are repeated six times.

Thereafter, screen display of the results obtained at the processes at step S120 to S140 on the display unit 16 is performed (step S150). Note, however, that if it is not necessary to visually check the results of the analysis of the internal data and the simulation results for the RIP processes, then the process at step S150 may be omitted.

FIG. 10 is a diagram showing an example of an output prediction report 620 displayed on the display unit 16 at step S150. Note that in FIG. 10, focus is placed on a job corresponding to one printing condition. The output prediction report 620 includes a basic information display field 625, a RIP speed prediction display field 626, an amount-of-ink-consumed prediction display field 627, and a printer information display field 628. In the basic information display field 625 there is displayed basic information about the corresponding job. In the RIP speed prediction display field 626 there are displayed the predicted values of RIP speeds (predicted RIP speeds), etc., in a case in which a RIP process is performed in an actual environment (execution server 200), based on results of a process performed by the RIP speed predicting section 54. In the amount-of-ink-consumed prediction display field 627 there are displayed the predicted values of the amounts of ink consumed for each ink color, based on results of a process performed by the amount-of-ink-consumed predicting section 55. In the printer information display field 628 there is displayed information about a printing machine used for the corresponding job.

Regarding the output prediction report 620, regions 621 to 624 can be selected (clicked) with a mouse which is the input operation means 15. When the region 621 is selected, as shown in FIG. 10, all of the basic information display field 625, the RIP speed prediction display field 626, the amount-of-ink-consumed prediction display field 627, and the printer information display field 628 are displayed. When the region 622 is selected, only the RIP speed prediction display field 626 is displayed. When the region 623 is selected, only the amount-of-ink-consumed prediction display field 627 is displayed. When the region 624 is selected, only the printer information display field 628 is displayed. Note that the configuration may be such that the basic information display field 625 is also displayed when the regions 622 to 624 are selected.

As shown in FIG. 10, in the RIP speed prediction display field 626 in the output prediction report 620 there are provided two buttons 65 and 66 for displaying RIP time prediction graphs (simulation graphs). The two buttons 65 and 66 can be selected (clicked) with the mouse. When the button 65 is selected with the mouse, a RIP time prediction graph for the front sides of sheets is displayed. When the button 66 is selected with the mouse, a RIP time prediction graph for the back sides of sheets is displayed. By selecting the button 65 or the button 66, a RIP prediction screen including a RIP time prediction graph is displayed on the display unit 16.

Figure 11:
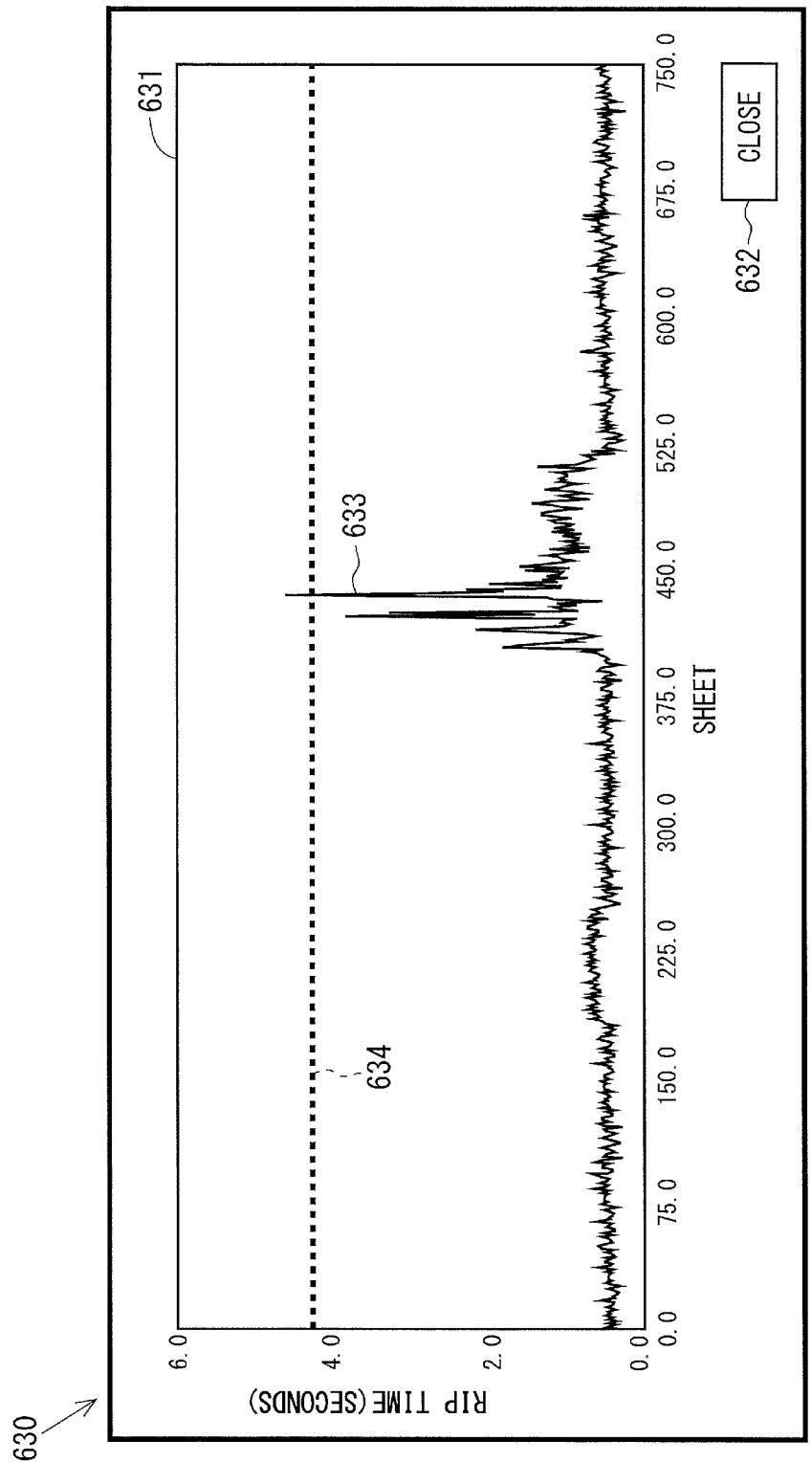
FIG. 11 is a diagram showing an example of a RIP prediction screen in the first embodiment.

FIG. 11 is a diagram showing an example of a RIP prediction screen 630 displayed on the display unit 16 at step S150. As shown in FIG. 11, the RIP prediction screen 630 includes a RIP time prediction graph 631 with a horizontal axis as sheet number and a vertical axis as RIP time; and a close button 632. The close button 632 can be selected (clicked) with the mouse, and when the close button 632 is selected, the RIP prediction screen 630 is hidden. Focusing on the RIP time prediction graph 631, the predicted values of RIP time (predicted RIP time) for every 750 sheets are represented by a line graph given reference sign 633. In addition, RIP time corresponding to printing speed at which a printout is actually performed is represented by a dotted line given reference sign 634.

Figure 12:
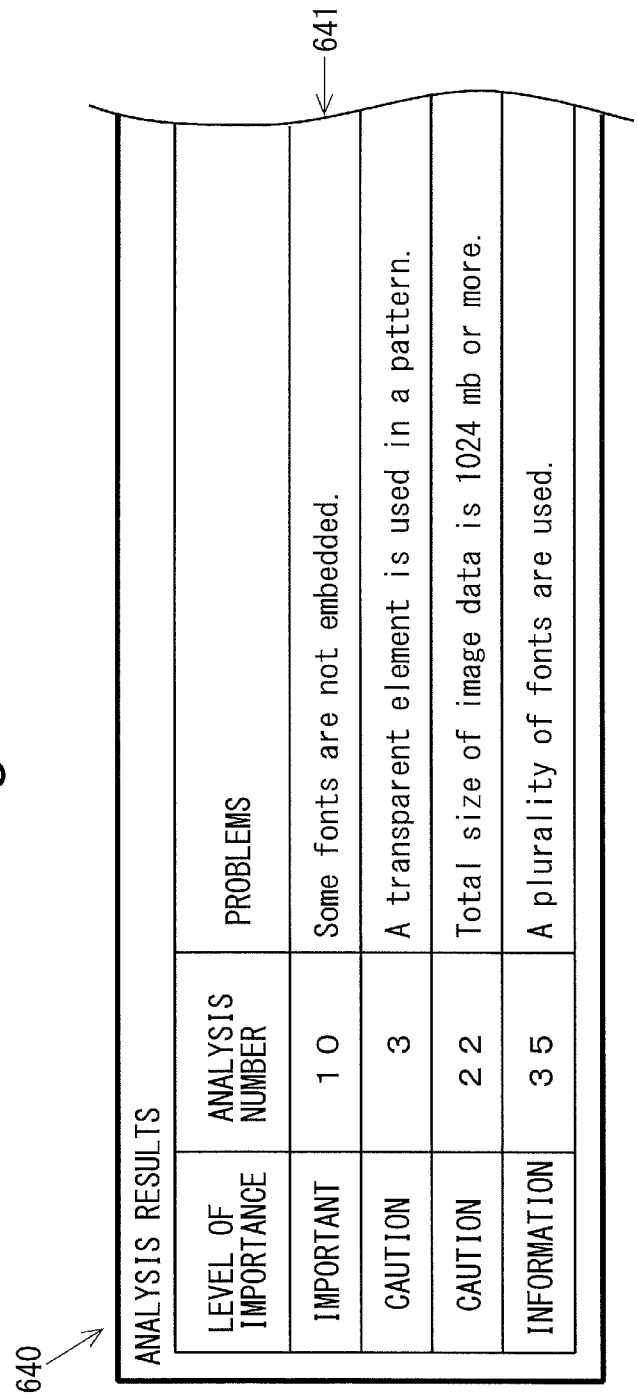
FIG. 12 is a diagram showing an example of an analysis result screen in the first embodiment.

In addition, at step S150, the results of the analysis of the internal data performed by the PDF analyzing section 53 can also be displayed on the display unit 16. FIG. 12 is a diagram showing an example of an analysis result screen 640 showing results of analysis of internal data. The analysis result screen 640 displays problems about a certain sheet. More specifically, results (analysis results) for items having problems concerning pages included in a corresponding sheet number, among a plurality of analysis items, are displayed in order of importance on the analysis result screen 640.

After completion of step S150, a sorting process by the target data sorting section 58 is performed (step S160). A detailed procedure of this step S160 will be described later.

A process at step S170 is typically performed immediately before performing a continuous printing process. At a point in time immediately before performing a continuous printing process, a plurality of print-target identifying records are registered in a continuous printing list. Regarding the continuous printing list at that point in time, the plurality of print-target identifying records are not arranged in processing order. Hence, at step S170, the record rearranging section 60 rearranges the print-target identifying records registered in the continuous printing list. Here, the rearrangement is performed based on the RIP speed corresponding to each print-target identifying record, so that a continuous printing process is performed in increasing order of the RIP speed, based on the above-described system requirement.

If the RIP speeds of respective PDF files are those shown in FIG. 13 and a continuous printing list before performing the process at step S170 is that shown in a portion given reference sign 71 in FIG. 13, then a continuous printing list after performing step S170 is that shown in a portion given reference sign 72 in FIG. 14. As can be grasped from FIG. 14, the print-target identifying records are rearranged in ascending order of the RIP speed.

Finally, a continuous printing process is performed based on the continuous printing list obtained by the rearrangement at step S170 (step S180). More specifically, for a group of PDF files identified by the print-target identifying records registered in the continuous printing list obtained by the rearrangement, a continuous printing process including a RIP process performed by an execution server 200 and a print process performed by an inkjet printing apparatus 300 using print data obtained as a result of the RIP process is performed under a printing condition corresponding to the continuous printing list.

Note that in the present embodiment, a page data specifying step is implemented by step S100, a requirement setting step is implemented by step S110, a page data analyzing step is implemented by step S120, a RIP simulation step is implemented by step S130 and S140, a target data sorting step is implemented by step S160, a record rearranging step is implemented by step S170, and a continuous printing performing step is implemented by step S180.

<1.5.2 Sorting Process>

Figure 15:
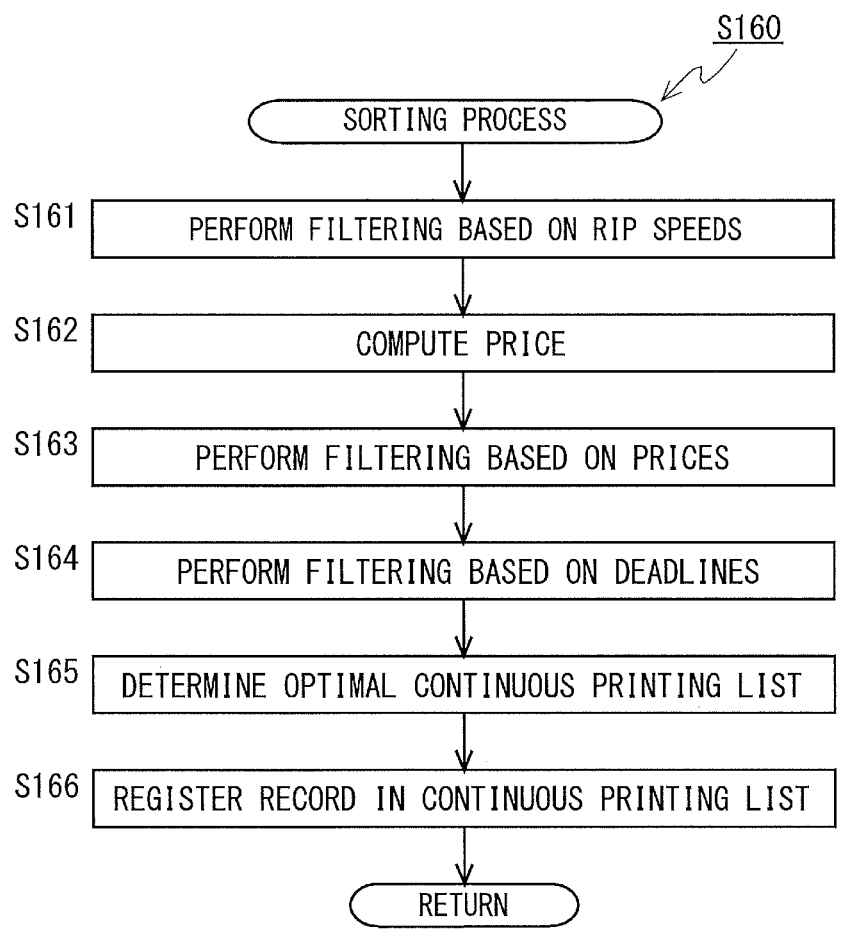
FIG. 15 is a flowchart for describing an example of a detailed procedure of the sorting process in the first embodiment.

Next, an example of a detailed procedure of the sorting process (step S160 of FIG. 9) will be described with reference to a flowchart shown in FIG. 15. Here, it is assumed that as requirements for printing a PDF file (page data) that is focused on as target data, the following two customer's conditions are set at step S110 of FIG. 9. Note that a first customer's condition has a higher priority than a second customer's condition.

First customer's condition: the budget is 6000 yen or less
Second customer's condition: the deadline is Dec. 25, 2019.

A set of printing conditions that are determined to be adoptable in a printing process for the target data in the course of the sorting process is hereinafter referred to as "sorting destination candidate". In addition, it is assumed that data by which results shown in a portion given reference sign 73 in FIG. 7 are obtained is the target data.

After starting a sorting process, first, filtering based on RIP speeds is performed (step S161). When the RIP speed is lower than printing speed, there is a possibility that a RIP process for the target data may not be performed in time for the output operation of an inkjet printing apparatus 300. Hence, at step S161, based on simulation results, a printing condition with which only a lower RIP speed than printing speed can be obtained is excluded from sorting destination candidates. In this example, the RIP speed for a printing condition "XB(P1)" is lower than printing speed (see FIG. 7). Thus, the printing condition "XB(P1)" is excluded from sorting destination candidates. As a result, a list of sorting destination candidates is that shown in FIG. 16.

Then, regarding each printing condition that remains as a sorting destination candidate, a price is computed (step S162). At step S140 of FIG. 9, the amount of ink consumed (predicted amount of ink consumed) for each ink color is determined. In addition, in the present embodiment, a coefficient for price calculation for each ink color is preset (see FIG. 8). Thus, when the predicted amounts of ink consumed for a color B, a color C, a color M, and a color Y are B1, C1, M1, and Y1, respectively, and the coefficients for the color B, the color C, the color M, and the color Y are B2, C2, M2, and Y2, respectively, a price P can be calculated by the following equation (1):

$$P = B1 \times B2 + 01 \times C2 + M1 \times M2 + Y1 \times Y2 \quad (1)$$

In this example, the prices for respective printing conditions are those shown in FIG. 17.

Then, filtering based on the prices calculated at step S162 is performed (step S163). In this example, the first customer's condition is that the budget is 6000 yen or less, and thus, a printing condition with which the price exceeds 6000 yen is excluded from sorting destination candidates. Specifically, a printing condition "XB(P2)" and a printing condition "YZ(P2)" are excluded from sorting destination candidates. As a result, a list of sorting destination candidates is that shown in a portion given reference sign 74 in FIG. 18.

Then, filtering based on deadlines is performed (step S164). Regarding this, as described above, information on a schedule for each printing condition can be obtained from the process management system. Thus, based on the information on a schedule, a deliverable date regarding the target data can be determined for each printing condition. Then, a printing condition with which the deliverable date does not meet the deadline set at step S110 of FIG. 9 is excluded from sorting destination candidates. Here, it is assumed that the deliverable dates for respective printing conditions are those shown in FIG. 19. As described above, the deadline is set on Dec. 25, 2019 as the second customer's condition in this example, and thus, a printing condition "XA(P2)" is excluded from sorting destination candidates. As a result, a list of sorting destination candidates is that shown in a portion given reference sign 75 in FIG. 20.

Then, an optimal continuous printing list is determined (step S165). Specifically, from among continuous printing lists corresponding to printing conditions that remain as sorting destination candidates at a point in time of completion of step S164, an optimal continuous printing list is determined based on the priorities of the respective requirements set at step S110 of FIG. 9. In this example, since the requirement for the budget has the highest priority, a continuous printing list corresponding to a printing condition "XA(P1)" with the lowest price is determined as an optimal continuous printing list.

Finally, a print-target identifying record corresponding to the target data is registered (added) in the continuous printing list determined at step S165 (step S166). In this example, if a continuous printing list before registration of the print-target identifying record is that shown in FIG. 21, then a continuous printing list after registration of the print-target identifying record is that shown in FIG. 22. In FIG. 22, a record given reference sign 77 is the added print-target identifying record.

Note that in the above-described example, a printing condition extracting step is implemented by step S161 to S164, and a record registering step is implemented by step S165 and S166.

1.6 Advantageous Effects

According to the present embodiment, the user can set customer's conditions regarding a budget, a deadline, quality, etc., for printing a PDF file (target data) specified as a continuous printing target. A simulation of a RIP process is performed on the target data under a plurality of printing conditions which are set in advance. Then, an optimal printing condition for the target data is determined based on simulation results so as to satisfy the set customer's conditions, and a record (print-target identifying record) that identifies the target data is registered in a continuous printing list corresponding to the printing condition. That is, in a case in which continuous printing is performed using a plurality of printing conditions, it becomes possible to perform, for each PDF file, a printing process under an optimal printing condition, taking into account the amounts of ink consumed, the operating conditions of each inkjet printing apparatus 300, etc. Here, since the determination of the optimal printing condition based on the simulation results is made by the control server 100, there is no load on the user. As described above, according to the present embodiment, in the printing system that performs continuous printing using a plurality of printing conditions, continuous printing in suitable order that satisfies each customer's needs can be implemented, with no load on the user.

In addition, in the present embodiment, by rearranging print-target identifying records registered in a continuous printing list, a continuous printing process is performed in increasing order of the RIP speed. Hence, for example, the occurrence of a shortage of spooling space is suppressed, improving the stability of a continuous printing process.

Furthermore, in the present embodiment, only one control server 100 that performs a simulation of a RIP process is provided for the plurality of inkjet printing apparatuses 300. Conventionally, a server for simulations is provided for each inkjet printing apparatus 300, and thus, according to the present embodiment, costs are significantly reduced over the conventional system.

1.7 Variants

In continuous printing, a series of processes such as a RIP process and a print process using print data obtained as a result of the RIP process are continuously performed on a plurality of page data. However, if an error occurs when a process is performed on one page data, then a continuous printing process stops in the middle. Thus, it is desirable that page data that is highly likely to cause an error upon continuous printing be excluded from continuous printing targets. Hence, examples in which registration of a print-target identifying record in a continuous printing list is not performed regarding page data that is highly likely to cause an error upon continuous printing are described below as variants of the above-described first embodiment.

<1.7.1 First Variant>

In the above-described first embodiment, as a system requirement, a requirement that a continuous printing process be performed in increasing order of the RIP speed is set.

In the present variant, as a system requirement, a requirement is further set that a PDF file having an error in results for a RIP process (simulation results) under a certain printing condition is excluded from continuous printing targets that use the printing condition. Note that this requirement is set by the requirement setting section 57 (see FIG. 3) at step S110 of FIG. 9.

By setting a requirement such as that described above, in the present variant, for a PDF file (target data) that caused an error in a simulation of a RIP process, upon a sorting process (step S160 of FIG. 9), a print-target identifying record is not registered in a continuous printing list corresponding to a printing condition with which the error has occurred.

For example, referring to simulation results shown in FIG. 7, results of RIP processes for data given reference sign 76 include errors. Specifically, a printing condition "YZ(P1)" and a printing condition "YZ(P2)" do not have errors, but a printing condition "XA(P1)", a printing condition "XA(P2)", a printing condition "XB(P1)", and a printing condition "XB(P2)" have errors. In the case of this example, at an initial point in time of a sorting process, the printing condition "YZ(P1)" and the printing condition "YZ(P2)" are included in sorting destination candidates, but the printing condition "XA(P1)", the printing condition "XA(P2)", the printing condition "XB(P1)", and the printing condition "XB(P2)" are excluded from sorting destination candidates.

According to the present variant, a PDF file that caused an error in a simulation of a RIP process under a certain printing condition is excluded from continuous printing targets that use the printing condition. Hence, a continuous printing process is prevented from stopping in the middle due to an error in a RIP process.

<1.7.2 Second Variant>

In the above-described first embodiment, as a system requirement, a requirement that a continuous printing process be performed in increasing order of the RIP speed is set. In the present variant, as a system requirement, a requirement is further set that a PDF file whose internal data is abnormal is excluded from continuous printing targets. Note that this requirement is set by the requirement setting section 57 (see FIG. 3) at step S110 of FIG. 9.

By setting a requirement such as that described above, in the present variant, for a PDF file (target data) in which abnormality is found in its internal data by analysis of the internal data by the PDF analyzing section 53 (step S120 of FIG. 9), upon a sorting process (step S160 of FIG. 9), a print-target identifying record is not registered in any continuous printing list.

According to the present variant, a PDF file whose internal data is abnormal is excluded from continuous printing targets. Hence, a continuous printing process is prevented from stopping in the middle due to abnormality in internal data of a PDF file.

2. Second Embodiment

A second embodiment of the present invention will be described. The second embodiment assumes a case of adopting so-called "Web to Print" in which submission of page data and printing orders from customers are performed through the Internet. The following mainly describes differences from the above-described first embodiment.

2.1 Configuration

Figure 23:
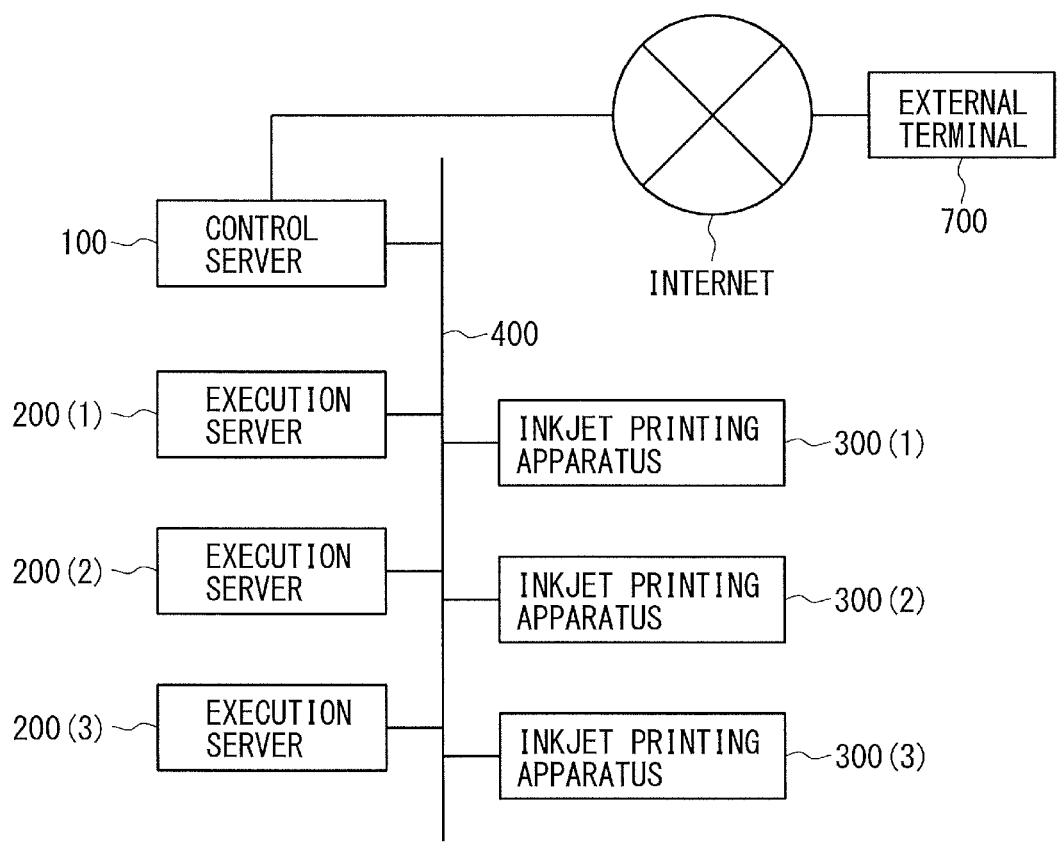
FIG. 23 is an overall configuration diagram of a printing system according to a second embodiment of the present invention.

FIG. 23 is an overall configuration diagram of a printing system of the present embodiment. The printing system includes an external terminal 700 connected to the control server 100 through the Internet, in addition to the components of the above-described first embodiment. Note that although multiple external terminals 700 can be connected to the control server 100, FIG. 23 shows only one external terminal 700.

As in the above-described first embodiment, the control server 100 controls the entire printing process, the execution servers 200(1) to 200(3) each perform a RIP process on print-target page data when a printout is actually performed, and the inkjet printing apparatuses 300(1) to 300(3) each perform a printout based on print data (image data in bitmap format obtained as a result of the RIP process). In addition, as in the above-described first embodiment, the control server 100 has RIP simulation software (RIP simulation program) installed thereon, and a RIP process is performed in the control server 100 in a simulation stage before a printout is actually performed.

In the printing system, a customer can submit page data to the control server 100 and place a printing order with the control server 100, using a web browser on the external terminal 700. In addition, specifically, as will be described later, the customer can set requirements for printing.

A functional configuration is substantially the same as that of the above-described first embodiment (see FIG. 3). Note, however, that the operations of the page data specifying section 52, the requirement setting section 57, and the target data sorting section 58 differ from those of the first embodiment. Those operations will be described below.

The page data specifying section 52 of the present embodiment is implemented by displaying a screen for specifying submission data (processing-target PDF file) on the external terminal 700. On the screen, a customer specifies submission data. The submission data (target data in the present embodiment) specified by the customer on the external terminal 700 is sent to the control server 100 through the Internet.

The requirement setting section 57 of the present embodiment is implemented by displaying a requirement input screen for inputting, by the customer, customer's conditions on the external terminal 700. As in the above-described first embodiment, examples of the customer's conditions include a requirement for a budget, a requirement for a deadline, and a requirement for quality. Information on the requirements set by the customer on the external terminal 700 is sent to the control server 100 through the Internet.

In the present embodiment, the target data sorting section 58 first extracts one or more printing conditions that satisfy the requirements set by the requirement setting section 57, based on results held in the result data storing section (result database) 142. Then, the target data sorting section 58 presents one or more delivery information for identifying the respective extracted one or more printing conditions, to the external terminal 700 in a selectable mode. Furthermore, the target data sorting section 58 registers a print-target identifying record in a continuous printing list corresponding to a printing condition identified by delivery information selected by the customer on the external terminal 700.

2.2 Processing Procedure

Figure 24:
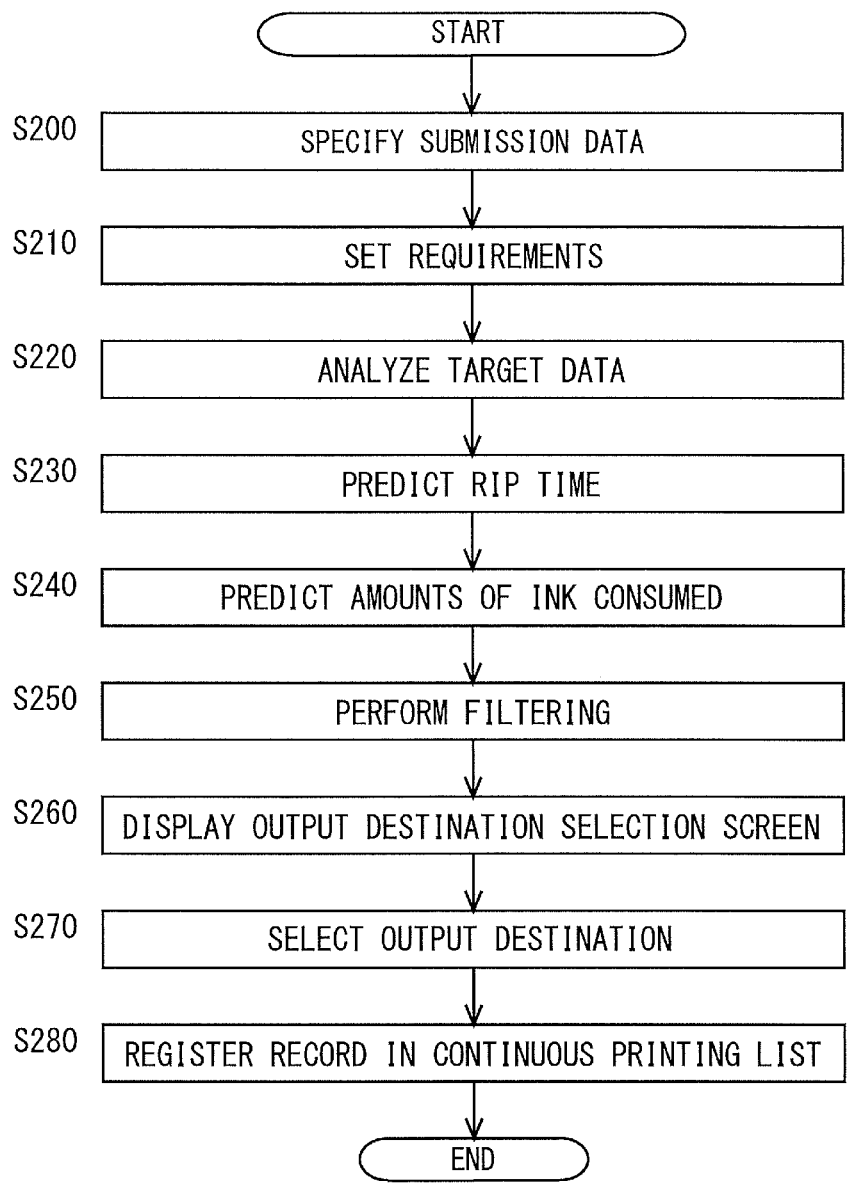
FIG. 24 is a flowchart for describing a processing procedure from submission of page data to registration of a print-target identifying record in a continuous printing list in the second embodiment.

Next, a processing procedure from specification of submission data to registration of a print-target identifying record in a continuous printing list will be described with reference to a flowchart shown in FIG. 24. Note that processes performed after registration of print-target identifying records regarding a plurality of page data in a continuous printing list (processes at and after step S170 of FIG. 9) are the same as those of the above-described first embodiment.

First, a screen for specifying submission data is displayed on the external terminal 700, and a customer specifies submission data (a PDF file which is a continuous printing target) on the screen (step S200). The submission data (target data) specified at this step S200 is sent to the control server 100 through the Internet and stored in the page data storing section 51.

Figure 25:
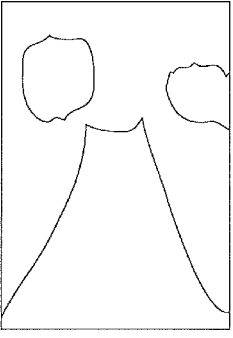
FIG. 25 is a diagram showing an example of a requirement input screen in the second embodiment.
Figure 29:
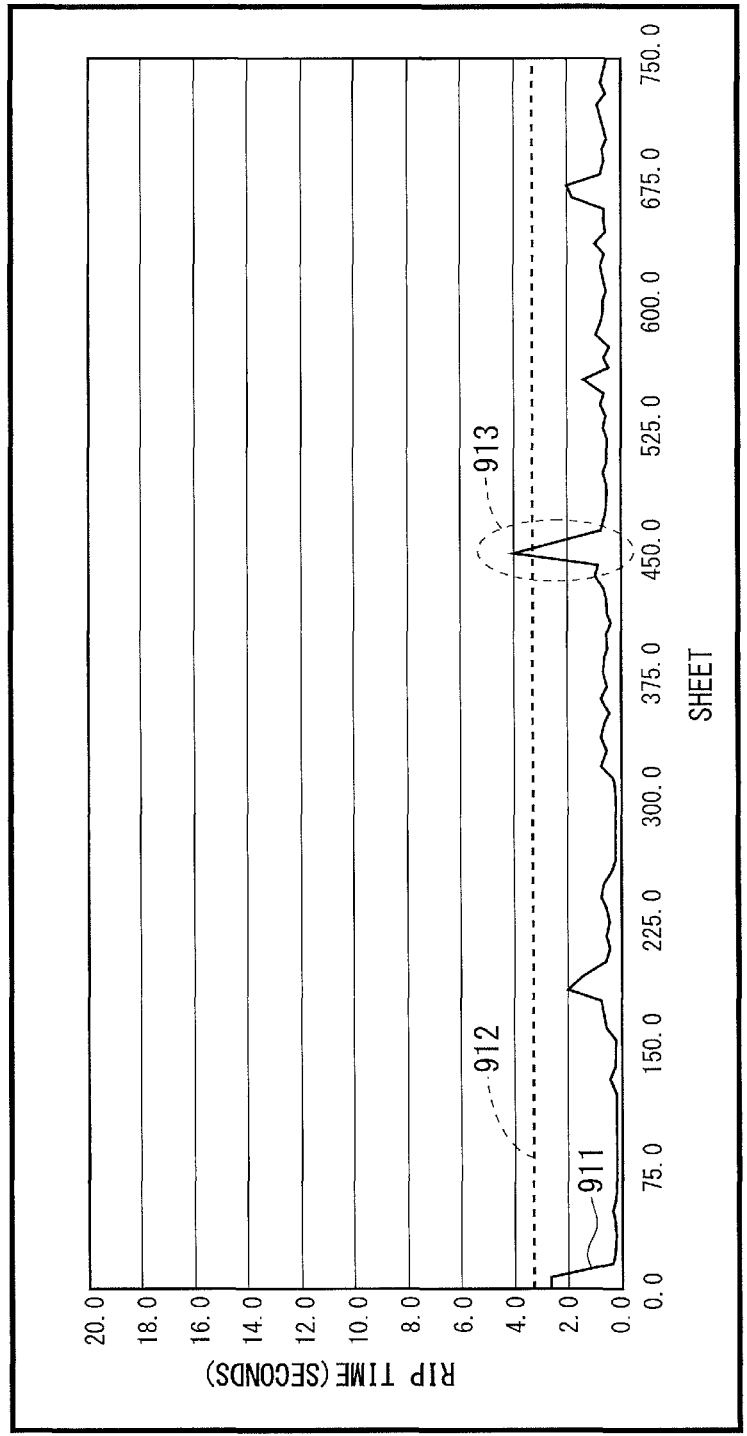
FIG. 29 is a diagram showing an example of a RIP time prediction graph included in an output prediction report in the conventional example.
Figure 31:
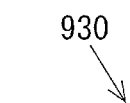
FIG. 31 is a diagram showing an example of a detailed information page in the conventional example.

Then, a requirement input screen is displayed on the external terminal 700, and the customer sets requirements for printing on the requirement input screen (step S210). FIG. 25 is a diagram showing an example of a requirement input screen 800. The requirement input screen 800 shown in FIG. 25 is provided with a submission data display field 801 that displays an image of target data, and a customer's condition input field 802 for inputting customer's conditions. The requirement input screen 800 is also provided with an OK button 808 for confirming input content in the customer's condition input field 802, and a cancel button 809 for canceling input content in the customer's condition input field 802. In the example shown in FIG. 25, the customer can set requirements for a budget, a deadline, and quality in the customer's condition input field 802. In addition, as shown in a portion given reference sign 804, the customer's condition input field 802 is provided with check boxes for the budget, deadline, and quality. The customer places a check box corresponding to an item with the highest priority among the budget, deadline, and quality, in a selected state. In the example shown in FIG. 25, the budget is set as an item with the highest priority. Note that information on the requirements set at this step S210 is sent to the control server 100 through the Internet.

Then, the PDF analyzing section 53 analyzes internal data constituting the target data (step S220). Then, the RIP speed predicting section 54 performs a RIP process on the target data on the control server 100, and predicts a RIP speed and RIP time for each sheet, based on results of the RIP process (step S230). Then, the amount-of-ink-consumed predicting section 55 predicts the amount of ink consumed for each ink color (step S240). The processes at step S220 to S240 are performed for each printing condition, as with the processes at step S120 to S140 of the above-described first embodiment.

Then, the target data sorting section 58 performs filtering in which only printing conditions that satisfy the requirements set at step S210 are extracted from among printing conditions prepared in the printing system, based on results held in the result data storing section (result database) 142 (step S250).

Then, the target data sorting section 58 displays, on the external terminal 700, an output destination selection screen for selecting, by the customer, a printing condition that is adopted for an actual printing process from among the printing conditions extracted at step S250 (step S260). FIG. 26 is a diagram showing an example of an output destination selection screen 810. The output destination selection screen 810 includes a delivery information display field 811 that displays delivery information for a case of adopting each printing condition. One row in the delivery information display field 811 shows delivery information corresponding to one printing condition (output destination). In the example shown in FIG. 26, as the delivery information, an output sample, a price, and an available date are presented. In addition, each row in the delivery information display field 811 is provided with an OK button 819. That is, the customer can select delivery information using the OK button 819. Note that display order in the delivery information display field 811 is determined taking into account an item that is set to have the highest priority on the requirement input screen 800. As described above, at step S260, one or more delivery information for identifying respective one or more printing conditions that satisfy the requirements set at step S210 are presented on the external terminal 700 in a selectable mode.

Then, the customer presses an OK button 819 corresponding to any one of the plurality of delivery information on the output destination selection screen 810 (step S270). That is, a printing condition (output destination) that is adopted for an actual printing process is selected.

Finally, the target data sorting section 58 registers a print-target identifying record in a continuous printing list corresponding to a printing condition identified by the delivery information selected by the customer on the external terminal 700 (step S280).

Note that in the present embodiment, a page data specifying step is implemented by step S200, a requirement setting step is implemented by step S210, a page data analyzing step is implemented by step S220, a RIP simulation step is implemented by step S230 and S240, and a target data sorting step is implemented by step S250 to S280.

2.3 Advantageous Effects

According to the present embodiment, a customer (a person or a company that requests a printing company for printing) can set customer's conditions regarding a budget, a deadline, quality, etc., upon request for printing. Then, a simulation of a RIP process is performed on target data (a PDF file whose printing is requested by the customer) under a plurality of printing conditions which are set in advance. Printing conditions that satisfy the set customer's conditions are extracted based on simulation results, and delivery information for identifying the extracted printing conditions are presented to the customer in a selectable mode. Then, a record (print-target identifying record) that identifies the target data is registered in a continuous printing list corresponding to a printing condition identified by delivery information selected by the customer. That is, in a case in which continuous printing is performed using a plurality of printing conditions, it becomes possible to perform a printing process under a printing condition that can satisfy customer's needs, taking into account the amounts of ink consumed, the operating conditions of each inkjet printing apparatus 300, etc. Here, since the determination of the printing condition is made by the customer on the external terminal 700, there is no load on a user (an operator at the printing company). As described above, also in the present embodiment, in the printing system that performs continuous printing using a plurality of printing conditions, continuous printing in suitable order that satisfies each customer's needs can be implemented, with no load on the user.

3. Others

The present invention is not limited to the above-described embodiments (including the variants), and various modifications can be made thereto without departing from the true spirit and scope of the present invention. For example, although the printing system including the plurality of inkjet printing apparatuses 300 is described as an example in the above-described embodiments, the present invention is not limited thereto. Even in a printing system including only one inkjet printing apparatus 300, if the inkjet printing apparatus 300 performs continuous printing using a plurality of printing conditions, then the present invention can be applied thereto.

Note that this application claims priority based on Japanese Patent Application No. 2020-33223 filed on Feb. 28, 2020 and entitled "PRINTING METHOD", the content of which is incorporated herein by reference.

What is claimed is:

1. A printing method for a printing system that performs, for each printing condition, continuous printing of a plurality of page data, the printing method comprising:
    a page data specifying step of specifying page data that is a continuous printing target;
    a requirement setting step of setting a requirement for printing for each target data that is the page data specified in the page data specifying step;
    a RIP simulation step of performing a simulation of a RIP process on the target data under a plurality of printing conditions which are set in advance;
    a target data sorting step of registering a record in a continuous printing list corresponding to one of the plurality of printing conditions so as to satisfy the requirement set in the requirement setting step, based on simulation result data for each of the plurality of printing conditions obtained in the RIP simulation step, the record identifying the target data; and
    a continuous printing performing step of performing a continuous printing process on a group of page data identified by records registered in a created continuous printing list, under a printing condition corresponding to the created continuous printing list, the continuous printing process including a RIP process and a print process using print data obtained as a result of the RIP process.

2. The printing method according to claim 1, wherein the target data sorting step includes:
    a printing condition extracting step of extracting one or more printing conditions that satisfy the requirement set in the requirement setting step from among the plurality of printing conditions; and
    a record registering step of registering the record in a continuous printing list corresponding to one of the one or more combinations of printing conditions extracted in the printing condition extracting step.

3. The printing method according to claim 2, wherein
    in the requirement setting step, priorities of requirements are set, and
    when two or more printing conditions are extracted in the printing condition extracting step, in the record registering step, a continuous printing list that is a registration destination of the record is determined from among two or more continuous printing lists corresponding to the two or more printing conditions, taking into account the priorities of the requirements.

4. The printing method according to claim 1, further comprising a record rearranging step of rearranging records registered in the continuous printing list, wherein
    in the RIP simulation step, a RIP speed is determined for each printing condition, as the simulation result data, and
    in the record rearranging step, rearrangement is performed based on the RIP speed corresponding to each record, so that a continuous printing process for the group of page data in the continuous printing performing step is performed in increasing order of the RIP speed, or that a continuous printing process for the group of page data is performed in such a manner that page data whose RIP speed is close to an average RIP speed is first processed and page data whose RIP speed is far from the average RIP speed is later processed.

5. The printing method according to claim 4, wherein in the target data sorting step, a continuous printing list that is a registration destination of the record is determined from among continuous printing lists corresponding to printing conditions with which a higher RIP speed than printing speed can be obtained.

6. The printing method according to claim 1, wherein
    in the RIP simulation step, a RIP speed is determined for each printing condition, as the simulation result data, and
    in the target data sorting step, a continuous printing list that is a registration destination of the record is determined from among continuous printing lists corresponding to printing conditions with which a higher RIP speed than printing speed can be obtained.

7. The printing method according to claim 1, wherein
    in the RIP simulation step, an amount of ink consumed for each ink color is determined for each printing condition, as the simulation result data,
    in the requirement setting step, a requirement for a budget is set as the requirement for printing, and
    in the target data sorting step, a determination as to whether to satisfy the requirement set in the requirement setting step is made for each printing condition by comparing a price with the budget set in the requirement setting step, the price being calculated based on preset coefficients for respective ink colors and amounts of ink consumed for respective ink colors determined in the RIP simulation step.

8. The printing method according to claim 1, wherein
    information on a schedule is held for each printing condition,
    in the requirement setting step, a requirement for a deadline is set as the requirement for printing, and
    in the target data sorting step, a determination as to whether to satisfy the requirement set in the requirement setting step is made for each printing condition, based on the information on a schedule and the deadline set in the requirement setting step.

9. The printing method according to claim 1, wherein for target data that caused an error in a simulation of a RIP process in the RIP simulation step, in the target data sorting step, the record is not registered in a continuous printing list corresponding to a printing condition with which the error has occurred.

10. The printing method according to claim 1, further comprising a page data analyzing step of analyzing internal data constituting the target data, wherein
    for the target data in which abnormality is found in the internal data in the page data analyzing step, in the target data sorting step, the record is not registered in any continuous printing list.

11. The printing method according to claim 1, wherein
    the printing system includes a simulation server that performs a simulation of a RIP process on the target data,
    the simulation server is connected to an external terminal through an Internet,
    specifying page data in the page data specifying step and setting the requirement in the requirement setting step are performed in the external terminal, and
    in the target data sorting step, one or more delivery information for identifying respective one or more printing conditions that satisfy the requirement set in the requirement setting step are presented on the external terminal in a selectable mode, and the record is registered in a continuous printing list corresponding to a printing condition identified by delivery information selected by the external terminal.

12. The printing method according to claim 1, wherein the printing system includes a plurality of printing machines that perform the print process; a plurality of RIP servers that perform the RIP process, the plurality of RIP servers being provided to have a one-to-one correspondence with the plurality of printing machines; and one simulation server that performs a simulation of a RIP process on the target data, and the one simulation server creates a continuous printing list corresponding to each printing condition set for each printing machine.

13. The printing method according to claim 12, wherein the one simulation server is connected to an external terminal through an Internet, specifying page data in the page data specifying step and setting the requirement in the requirement setting step are performed in the external terminal, and in the target data sorting step, one or more delivery information for identifying respective one or more printing conditions that satisfy the requirement set in the requirement setting step are presented on the external terminal in a selectable mode, and the record is registered in a continuous printing list corresponding to a printing condition identified by delivery information selected by the external terminal.

* * * * *